June 17, 1941.  A. M. ELLIOT  2,246,035
COLD CREAM SHIELD
Filed March 29, 1939
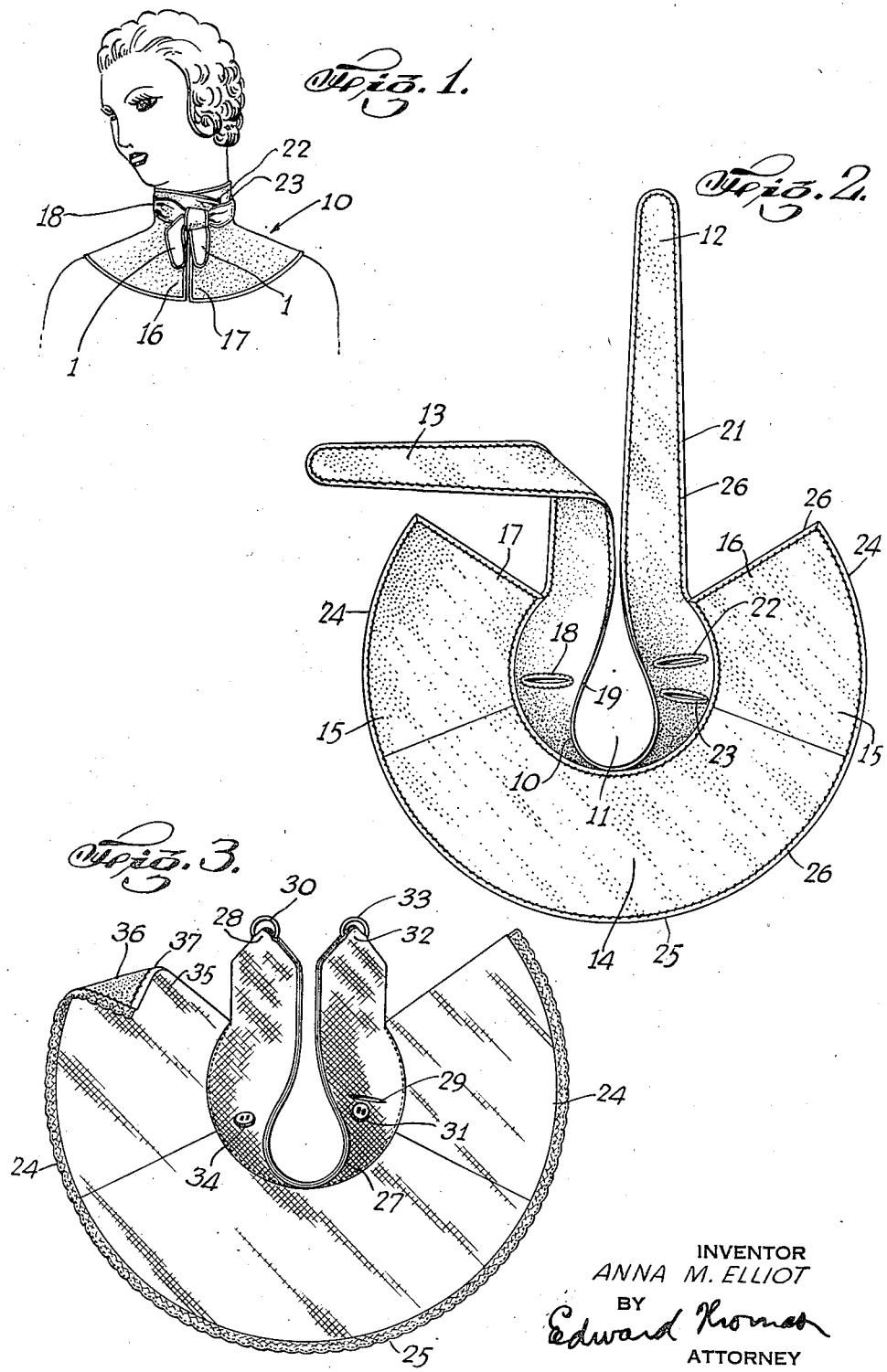
INVENTOR
ANNA M. ELLIOT
BY
Edward Thomas
ATTORNEY Patented June 17, 1941

2,246,035

UNITED STATES PATENT OFFICE 2,246,035

COLD CREAM SHIELD

Anna M. Elliot, Dallas, Tex.

Application March 29, 1939, Serial No. 264,681

1 Claim. (Cl. 2—50)

This invention relates to cold cream shields and is herein illustrated as embodied in a neck apron having a skirt in the shape of a truncated cone.

For many years the cosmetic art has progressed rapidly, and highly efficient cold creams and other preparations are available for applying to the neck and upper shoulders, but many ladies hesitate to use such creams and preparations because they are most effective if they remain on the skin all night, or for several hours.

When the skin carries such preparations for several hours it is almost inevitable that either clothes or nightclothes become contaminated with the preparation.

According to the present invention these and other difficulties are overcome, and it is possible to permit cream or other preparation to remain on the neck for hours without any possible contamination of clothes or night clothes or bed linen.

In the form illustrated the lady after applying the cream or preparation to her neck encircles the neck with a collar having a continuous skirt which overlies the adjacent parts of the shoulders, the upper chest and upper back, thus covering those parts and completely protecting from contamination any clothing of any kind, or bed clothes which come into contact with them.

In the forms shown the collar proper, or ship which encircles the neck, is shown as completely encircling it, being provided with an overlap on one end which is adapted to pass through an opening near the other end.

In the form shown the structure is either lined with rubber or made out of a rubberized fabric so that the liquid ingredients of a cream cannot wet through the fabric collar.

In the form shown the apron which extends around the edge of the collar is so cut that it tends to fall into a truncated cone with a periphery equal to about 250° of a circle.

Other features and advantages will hereinafter appear.

In the accompanying drawing,

Figure 1 is a perspective view of a head and shoulders wearing one form of the device.

Figure 2 is a top view of the same with its apron spread out flat.

Figure 3 shows an alternative form spread out.

A lady, shown in Figure 1, places the collar 10 of the device around her neck with the opening 11 in front, and then draws the free ends 12 and 13 so that the back 14 of the apron falls naturally on her back, the sides 15 of the apron lie upon her shoulders and the two edges 16 and 17 lie adjacent or overlapping in front.

She then passes the free end 12 inside of the collar, between it and her neck, and pushes the end 12 through a narrow vertical side opening 18, preferably midway between the top 19 and bottom 20 of the collar, and perhaps one third of its depth, so that the body 21 of the end 12 may be drawn through the opening 18 until a large part of the body 21 lies against the wearer's neck.

The wearer then passes the end 13 in through a similar side opening 23 in the collar, both preferably midway between the top 19 and bottom 20 of the collar.

Thus both of the ends 12 and 13 hang outside of the collar. The wearer now brings these two ends 12 and 13 together in front and loosely ties them there, thus holding the collar closed and its apron in place.

The apron is shown as made of two narrower gores 24 and of one wider gore 25, the gores as they lie flat covering about 250° of a circle, which is found to make an apron which lies flat on a wide range of human figures if it is about five inches deep.

The gores shown are stitched together by any suitable smooth seam and to the collar by another suitable smooth seam. The whole structure shown is made of an impervious rubber fabric bound around the edges with a fine silk or rayon binding 26, the openings 18, 22 and 23 being similarly bound.

The ends 12 and 13 are shown as slightly tapered.

The device of Figure 3 is especially adapted for fancy negligee wear, and is made of two relatively narrow gores 24 and one relatively wide gore 25, all of substantially the same size and shape as the gores of Figure 2, stitched to a collar 27.

The end 28 of the collar 27 is much shorter than the end 13, and is adapted to pass through a side opening 29, like the side opening 18 so that a loop 30 on its end may hitch over a button 31 and hold the body of the end 28 flat against the neck. Then the other end 32 is adapted to be carried around the throat of the wearer and caught by hitching a loop 33 over an outside button 34.

The silk fabric face 35 of the device of Figure 3 is shown as lined with sheet rubber fabric 36 which is stitched to the turned over edge of the face 35, and is shown as also stitched to an edging 37 of lace. The opening 29 is reinforced by turning the edge of the fabric 35 over the opposite side of the buttonhole edge.

It will be noted that the aprons in both figures are adapted to lie as flat closed truncated cones and that the collars are straight cut so that they stand up about cylindrically from the cone apron.

Having thus described certain embodiments of the invention, what is claimed is:

A shield including a fabric collar provided with an opening on one side and a plurality of openings on the other side and having an inner overlapping extension adapted to pass out through an opening in the collar, and a second extension from the opposite end of the collar adapted to pass in through one opening in the collar on the opposite side and then out through another opening, and to be then brought back and tied to the end of the other extension.

ANNA M. ELLIOT.